United States Patent [19]

Gest

[11] Patent Number: 4,548,166

[45] Date of Patent: Oct. 22, 1985

[54] ENGINE AIR CLEANER AND DUCT ARRANGEMENT

[75] Inventor: William E. Gest, Troy, Mich.

[73] Assignee: General Motors Corporation, Detroit, Mich.

[21] Appl. No.: 689,467

[22] Filed: Jan. 7, 1985

[51] Int. Cl.4 .................... F02B 77/00; B01D 50/00

[52] U.S. Cl. .................... 123/52 M; 123/198 E; 55/385 B; 55/484; 55/502

[58] Field of Search .......... 123/52 M, 52 MB, 195 C, 123/198 E, 52 MV, 52 MC; 55/419, 502, 510, 55/385 B, 484, DIG. 28

[56] References Cited

U.S. PATENT DOCUMENTS

| | | | |
|---|---|---|---|
| 1,373,459 | 4/1921 | Stirton | 123/52 M |
| 2,197,503 | 4/1940 | Martin | 123/52 M |
| 3,641,746 | 2/1972 | Smith et al. | 55/385 B |
| 4,126,199 | 11/1978 | Hansen et al. | 180/54 A |
| 4,204,585 | 5/1980 | Tsuboi et al. | 123/52 M |
| 4,354,458 | 10/1982 | Bury | 123/52 M |
| 4,364,340 | 12/1982 | Kimura | 55/385 B |
| 4,396,407 | 8/1983 | Reese | 55/419 |
| 4,440,120 | 4/1984 | Butler | 123/52 M |
| 4,440,555 | 4/1984 | Chichester | 55/385 B |

*Primary Examiner*—Ira S. Lazarus

*Attorney, Agent, or Firm*—R. L. Phillips

[57] ABSTRACT

An engine air cleaner and duct arrangement is disclosed for a vehicle for a vehicle having an engine mounted in front therein underneath a hood wherein a vehicle body cross-member extends underneath the hood with clearance space therebetween of smaller height than width and a latch mechanism latches the hood to the cross-member intermediate the ends of the latter. Twin updraft air cleaners each with an inlet and an outlet are mounted on and in front of the cross-member and an air duct is provided having a single delivery branch connected to an air intake of the engine and a pair of feeder branches connected to the respective air cleaner outlets. The feeder branches have a smaller cross-sectional height than width so as to extend through the otherwise unused space between the cross-member and hood and on opposite sides of the latch mechanism and join with the single delivery branch at a location rearward of the cross-member and connect with the air cleaner outlets at locations forward of the cross-member.

4 Claims, 5 Drawing Figures

ENGINE AIR CLEANER AND DUCT ARRANGEMENT

TECHNICAL FIELD

This invention relates to engine air cleaner and duct arrangements and more particularly to remote mounting of the air cleaner and compacting of the ducting.

BACKGROUND OF THE INVENTION

As vehicle underhood space decreases in the quest for lower vehicle hood lines to reduce air resistance, there is in the case of a front engine installation and attendant accessories resultantly less packaging space for the engine's air cleaner and fresh air intake duct which are typically mounted on and/or adjacent the engine. Moreover, the engine's radiator because of the low front end vehicle profile is typically of the low profile cross-flow type and occupies most of the frontal space directly ahead of the engine thereby making it difficult for an air intake duct to reach therearound for fresh ambient air.

SUMMARY OF THE INVENTION

The present invention recognizes that in the typical front engine vehicle application where the hood line is to be made as low as practicable or desirable, there is normally a body cross-member extending over the radiator that is spaced from the underside of the hood except for the location of a latch mechanism that latches the hood to the top of the cross-member intermediate the ends of the latter. In such an arrangement there is thus some clearance or space either side of the latch mechanism between the top of the cross-member and the underside of the hood. Accordingly to the present invention, there is provided for such a front engine vehicle a cost-effective space-saving arrangement comprising a twin updraft air cleaner housing mounted on and in front of the cross-member. The twin updraft air cleaner housing has separate air cleaner compartments each with an inlet and outlet and an air filter therebetween and there is then further provided an air duct having a single delivery branch connected to the engine air intake and a pair of feeder branches which are separately connected to the air cleaner outlets. And to enable the latter connection, the feeder branches are specially adapted cross-sectionalwise so as to extend between the cross-member and hood and on opposite sides of the latch mechanism to join with the single delivery branch rearward of the cross-member and radiator. Moreover, the twin air cleaner housing is simply constructed as a one-piece member while the air duct is also simply constructed but of two cooperating Y-shaped shell that are secured at their delivery branch to the engine intake by a clamp and are secured at their feeder branches to their respective air cleaner compartments by quick-release fasteners. And as a still further feature, there is provided a baffle in the entrance of each air cleaner compartment to separate out water and foreign particles prior to reaching the air filter elements.

DESCRIPTION OF THE PREFERRED EMBODIMENT

These and other objects, features and advantages of the present invention will become more apparent from the following description and drawing in which.

Figure 1:
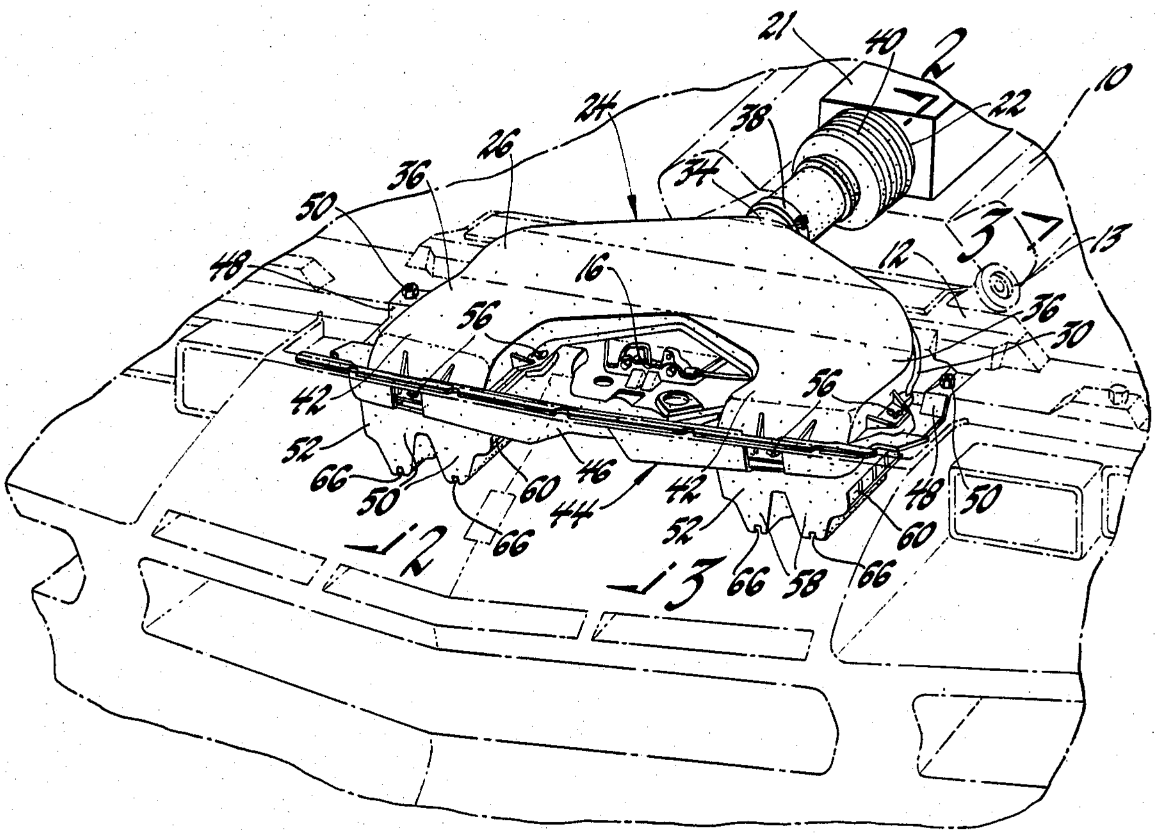
FIG. 1 is a partial three-dimensional view of a passenger car showing the front end thereof wherein there is installed the preferred embodiment of the engine air cleaner and duct arrangement of the present invention.
Figure 2:
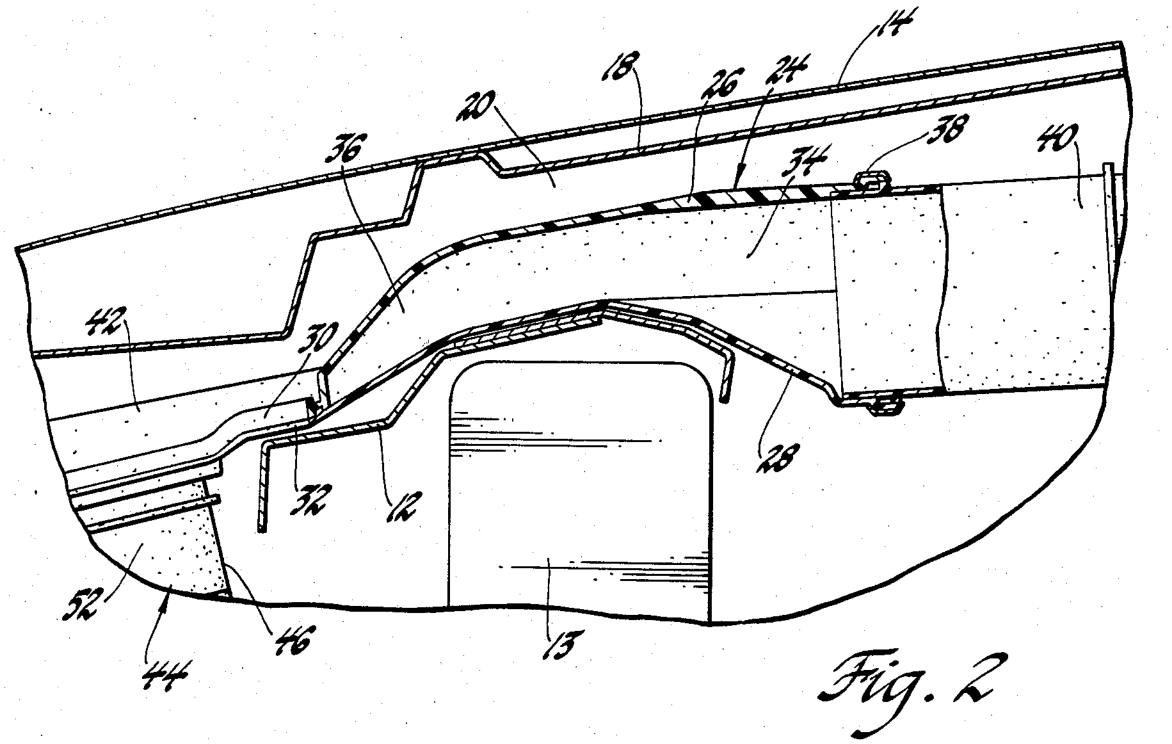
FIG. 2 is an enlarged sectional view taken along the line 2—2 in FIG. 1.

Referring to the drawing, there is shown in FIGS. 1 and 2 the front end of a passenger car having an engine 10 mounted in front therein behind a vehicle body cross-member 12 extending over the engine's radiator 13 and underneath a hood 14 wherein the hood extends over the cross-member and a latch mechanism 16 latches the hood to the top of the cross-member intermediate the ends of the latter. The hood 14 has a liner 18 on its underside leaving a clearance space 20 between the top of the cross-member 12 and the underside of the hood either side of the latch mechanism 16 (only the far side appearing in these views).

The engine 10 typically has a carburetor or fuel injection system 21 at its intake demanding that clean air be delivered thereto through an inlet 22 which for the adaptation of the present invention faces forwardly and is of cylindrical shape.

According to the present invention, there is provided an air cleaner duct assembly generally designated as 24 comprising a Y-shaped upper duct shell 26 and a Y-shaped lower duct shell 28 which sealingly engage along peripheral flanges 30 and 32 thereof and are formed inwardly thereof so as to cooperatively define a delivery branch 34 and a pair of feeder branches 36. The duct shells 26 and 28 at their delivery branch 34 are formed with a semi-cylindrical channel shape so as to provide a cylindrical exit that is adapted to be secured by a clamp 38 to a corrugated pipe 40 and thence thereby to the engine air intake 22. The duct shells 26 and 28 at their feeder branches 36 are, on the other hand, formed so as to provide a rectangular cross-sectional profile with this accomplished by forming the upper shell with an inverted channel shape and the lower shell with a flat cross-wise shape along the length of these branches. But more importantly, the feeder branches 36 are formed of smaller cross-sectional height than width so as to extend with a substantial flow area through the otherwise unused space 20 between the cross-member and hood and on opposite sides of the latch mechanism to join at their one end with the delivery branch 34 and connect at their other end 42 with a twin updraft air cleaner housing assembly generally designated as 44 remotely mounted from the engine in front of the cross-member 12 and radiator 13 so as to eliminate underhood space requirements therefor in the engine compartment.

Figure 3:
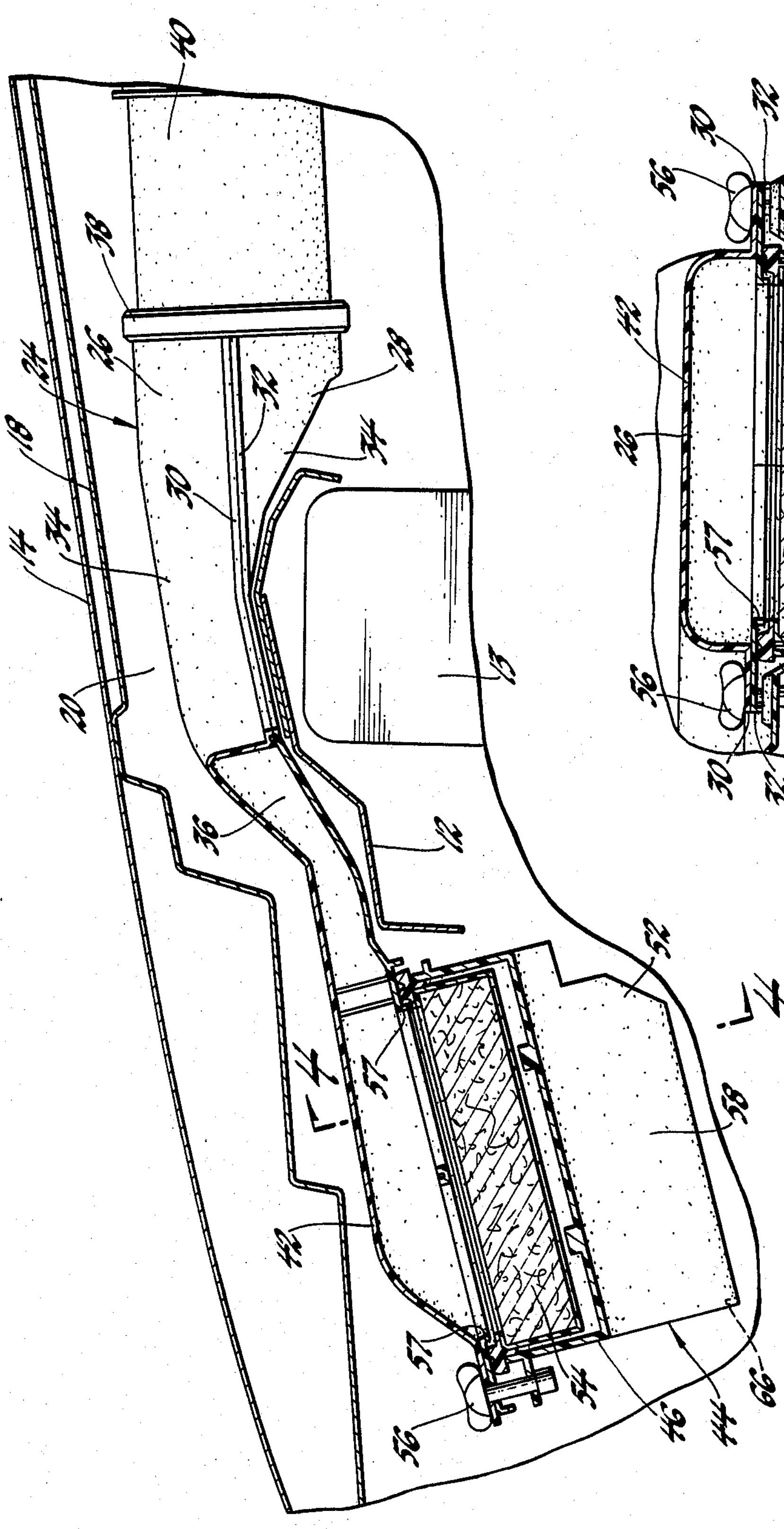
FIG. 3 is an enlarged sectional view taken along the line 3—3 in FIG. 1.
Figure 4:
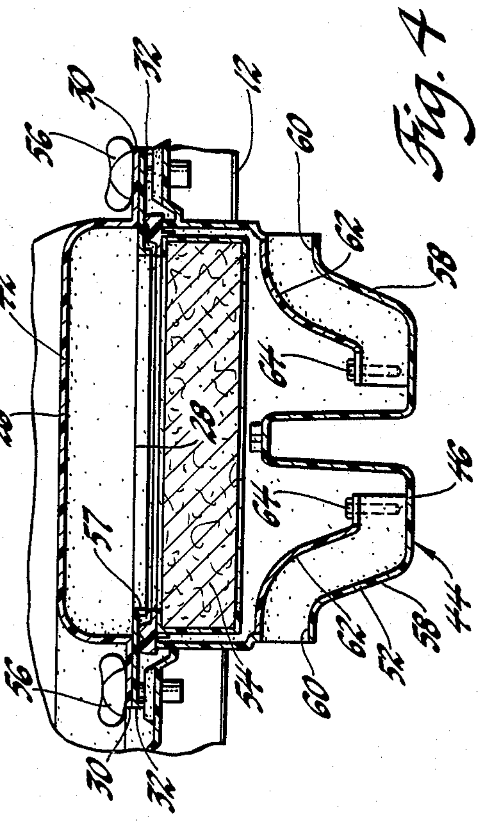
FIG. 4 is a sectional view taken along the line 4—4 in FIG. 3.
Figure 5:
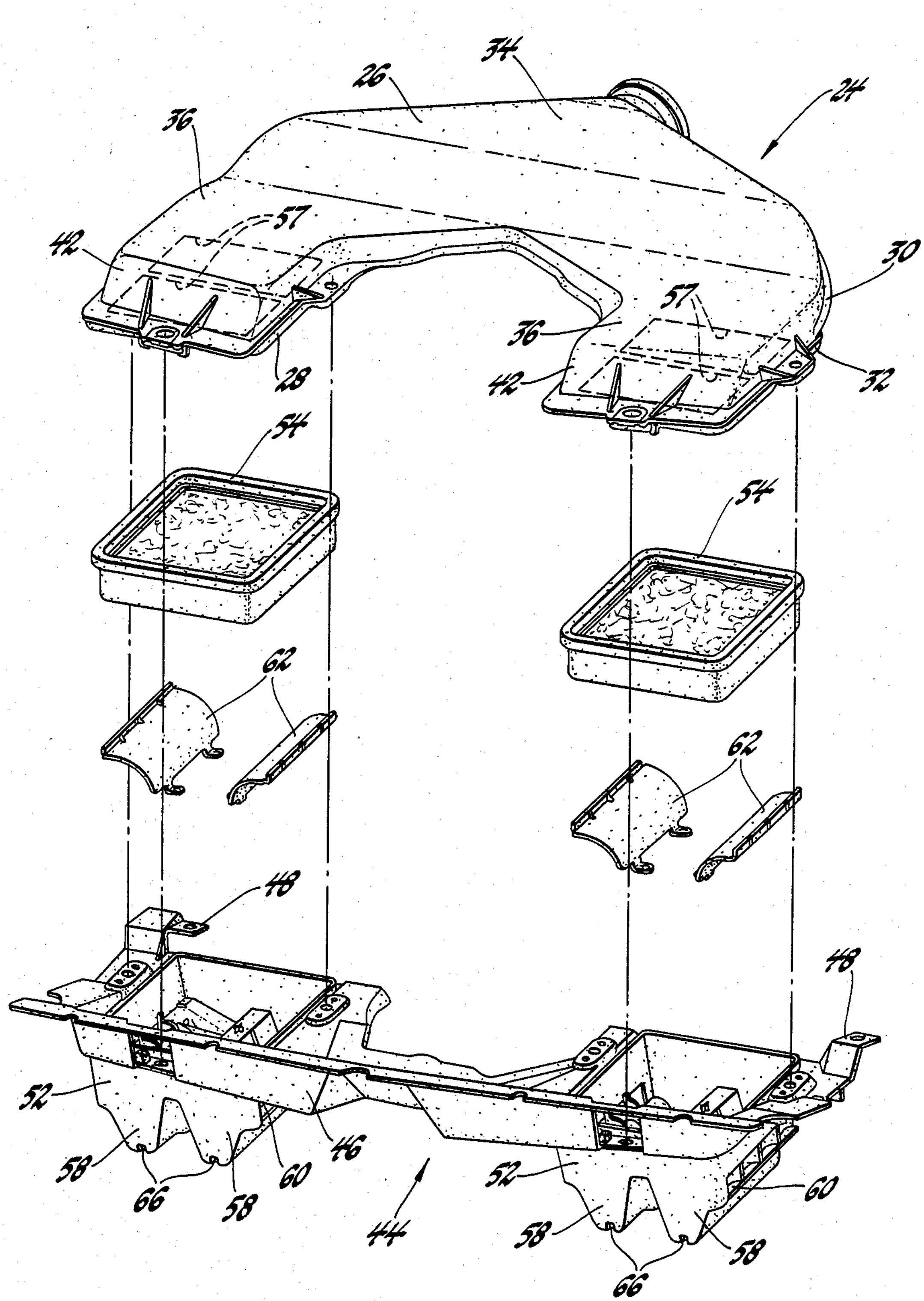
FIG. 5 is an exploded view of parts of the air cleaner and duct arrangement in FIG. 1.

The twin updraft air cleaner housing assembly 44 comprises a one-piece trough-shaped housing 46 having an ear 48 at each end by which it is secured with two bolts 50 to the body cross-member 12 (see FIGS. 1 and 5). The air cleaner housing 46 extends laterally across the vehicle body in an overhead location forward of the cross-member and has formed therein adjacent each end a downwardly hanging air cleaner compartment 52 in which is mounted a rectangular box-shaped air filter 54. The forward ends 42 of the feeder ducts 36 overhang the respective air cleaner compartments 52 and are each secured thereto by three quick-release fasteners 56 which also serve with the lower duct shell 28 to clamp the respective air filters in place as well as hold the duct shells together at this end while the clamp 38 holds them together at their other end. The lower duct 28 of each feeder has twin openings 57 therethrough below the upper duct shell 26 that align with the open top or outlet of the respective air cleaner compartment above the air filter 54 to provide communication therewith. Then for fresh ambient air entry to the system, each air cleaner compartment 52 has a pair of elongated side-by-side drainage basins 58 formed in the bottom thereof wherein the outer side wall of each basin is formed with a louvered opening 60 by which ambient air is inducted sideways into the basins and thence directed upward through the air filters and thence by the feeder ducts and the delivery duct to the engine intake. However, prior to such fresh air delivery to the filters, both water and foreign particle separation is provided by the inclusion in each drainage basin of a concave baffle 62 that is fastened at its base to the basin floor by two bolts 64 and is arranged opposite the associated louvered side entrance opening 60 so as to deflect the entering air downward into the bottom of the basin in a manner promoting separation out of any airborn water and particles onto the basin floor whereafter the air is allowed to flow upward behind the baffle to the overhead air filter 54. As seen in FIG. 3, the basins 58 extend longitudinally of the vehicle body and are tipped downward at their front end where a drain hole 66 is formed to drain away any collected water as well as particles separated out by the baffling thus provided.

Having thus described the preferred embodiment, it will be appreciated by those skilled in the art that a very space efficient, easy to service, air cleaner packaging arrangement has been provided by the up close underhood mounting of a twin updraft air cleaner remote from the engine compartment and in an otherwise unused space forward of the radiator. Furthermore, it will be appreciated that such arrangement with its low profile ducting provides an opportunity which might not otherwise exist for further lowering the hood line to reduce vehicle body air resistance as well as free up space in the engine compartment. And it will also be appreciated that the above described preferred embodiment is intended to be illustrative of the invention which may be modified within the scope of the appended claims.

The embodiments of the invention in which an exclusive property or privilege is claimed are defined as follows:

1. An engine air cleaner and duct arrangement for a vehicle having an engine mounted in front therein underneath a hood wherein a vehicle body cross-member extends underneath the hood with clearance space therebetween of smaller height than width and a latch mechanism latches the hood to the cross-member intermediate the ends of the latter: characterized by a pair of air cleaner means each with an inlet and an outlet and mounted on and in front of the cross-member, and air duct means having a single delivery branch connected to an air intake of the engine and a pair of feeder branches connected to the respective air cleaner outlets, said feeder branches being of smaller cross-sectional height than width so as to extend through the otherwise unused space between the cross-member and hood and on opposite sides of the latch mechanism and join with the single delivery branch at a location rearward of the cross-member and connect with the air cleaner outlets at locations forward of the cross member.

2. An engine air cleaner and duct arrangement for a vehicle having an engine mounted in front therein underneath a hood wherein a vehicle body cross-member extends underneath the hood with clearance space therebetween of smaller height than width and a latch mechanism latches the hood to the cross-member intermediate the ends of the latter: characterized by an air cleaner housing mounted on and in front of the cross-member and having a pair of air cleaner compartments each with an inlet and an outlet and an air filter therebetween wherein the inlet is below and the outlet is above the air filter, and air duct means having a single delivery branch connected to an air intake of the engine and a pair of feeder branches connected to the respective air cleaner compartment outlets, said feeder branches being of smaller cross-sectional height than width so as to extend through the otherwise unused space between the cross-member and hood and on opposite sides of the latch mechanism and join with the single delivery branch at a location rearward of the cross-member and connect with the air cleaner compartment outlets at locations forward of the cross-member.

3. An engine air cleaner and duct arrangement as set forth in claim 2 wherein each of the air cleaner compartments further has at least one drainage basin formed in the bottom thereof below the air filter and wherein the inlet for the compartment is formed as a side opening in the basin, and baffle means mounted in each compartment above the well and opposite the side opening therein for separating out incoming airborne water and particles prior to their reaching the air filter.

4. An engine air cleaner and duct arrangement for a vehicle having an engine mounted in front therein underneath a hood wherein a vehicle body cross-member extends underneath the hood with clearance space therebetween of smaller height than width and a latch mechanism latches the hood to the cross-member intermediate the ends of the latter: characterized by integral twin updraft air cleaner means each with an inlet and an outlet and an air filter therebetween and mounted on and in front of the cross-member and wherein the outlets are above the respective filters, air duct means comprising upper and lower Y-shaped shells that are peripherally joined to cooperatively define a single delivery branch connected to an air intake of the engine and a pair of feeder branches connected to the respective air cleaner outlets, said feeder branches being of smaller cross-sectional height than width so as to extend through the otherwise unused space between the cross-member and hood and on opposite sides of the latch mechanism and join with the single delivery branch at a location rearward of the cross-member and connect with the air cleaner outlets at locations forward of the cross-member and atop the air cleaner means.

* * * * *